United States Patent [19]
Benson et al.

[11] Patent Number: 4,716,460
[45] Date of Patent: Dec. 29, 1987

[54] DISPLAY REFRESH MEMORY APPARATUS UTILIZING ONE HALF FRAME UPDATING

[75] Inventors: David J. Benson, Pijeras, N. Mex.; Carl H. Brown, Portland, Oreg.; William R. Hancock, Cedar Crest, N. Mex.

[73] Assignee: Sperry Corporation, Great Neck, N.Y.

[21] Appl. No.: 916,580

[22] Filed: Oct. 8, 1986

[51] Int. Cl.[4] .............................................. H04N 7/01
[52] U.S. Cl. .................................... 358/140; 340/739; 340/750; 358/160
[58] Field of Search ................ 358/140, 160; 340/750, 340/739

[56] References Cited

U.S. PATENT DOCUMENTS

| | | | |
|---|---|---|---|
| 4,148,070 | 4/1979 | Taylor | 358/140 |
| 4,484,187 | 11/1984 | Brown | 340/750 |
| 4,570,158 | 2/1986 | Bleich | 340/750 |
| 4,573,080 | 2/1986 | Maze | 358/140 |
| 4,587,557 | 5/1986 | Doornheim | 358/140 |
| 4,590,518 | 5/1986 | Fenster | 358/140 |
| 4,631,532 | 12/1986 | Grothe | 340/739 |
| 4,658,293 | 4/1987 | Arai | 358/140 |

*Primary Examiner*—Howard W. Britton
*Attorney, Agent, or Firm*—A. B. Cooper; A. L. Albin

[57] ABSTRACT

Refresh memory apparatus for use in a CRT raster display system utilizes half field storage memories for ping ponging between updating and readout. In one TV mode of operation the even and odd raster lines are stored in the respective memories and in another TV mode the top and bottom halves of the frame are stored therein. The most significant bit and least significant bit of the vertical address signals are multiplexed to control the ping pong reading and writing of the memories and are multiplexed with the remainder of the address signal to provide the read and write addresses for the memories. The multiplexers are controlled in accordance with the TV mode in which the system is operating.

8 Claims, 1 Drawing Figure

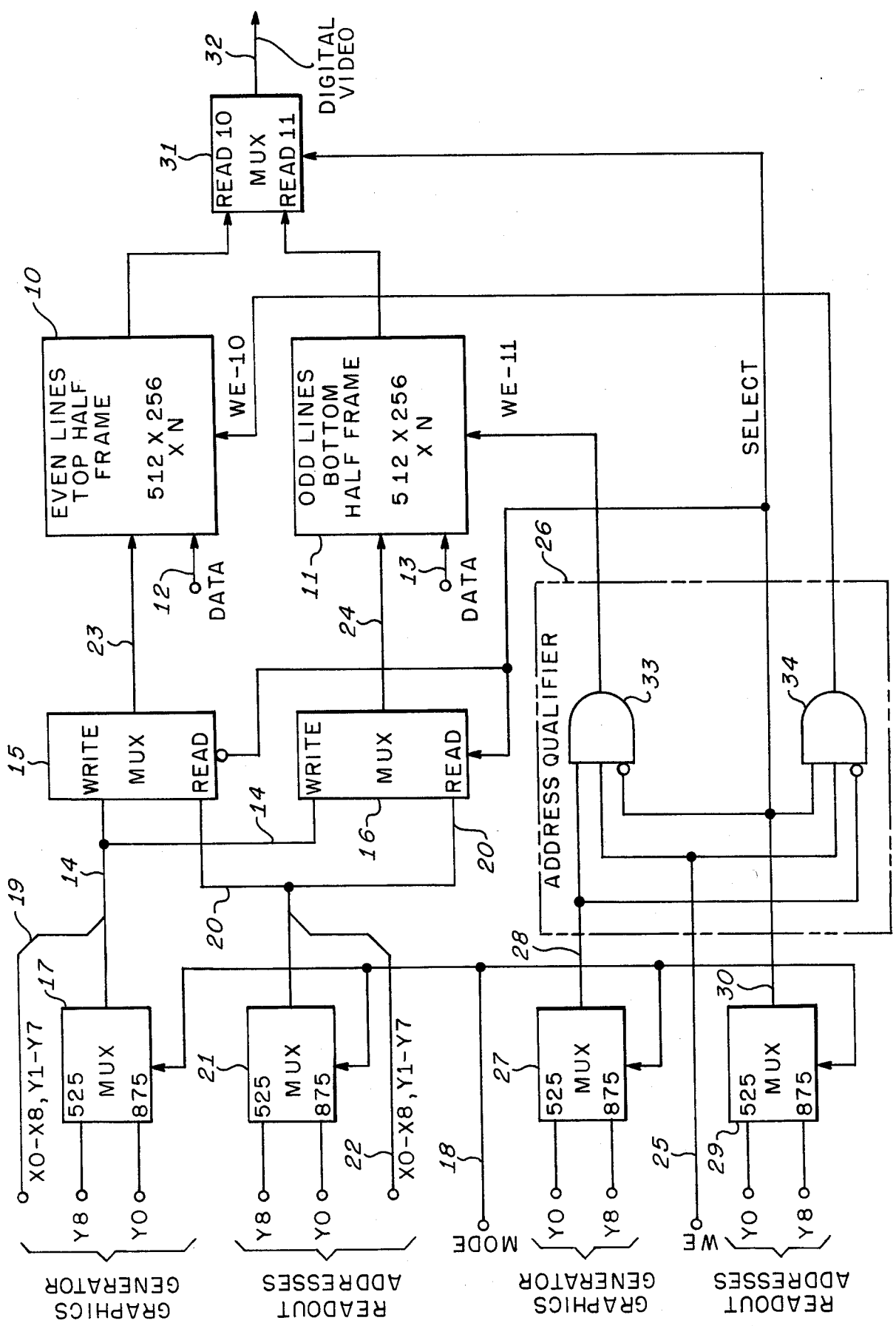

DISPLAY REFRESH MEMORY APPARATUS UTILIZING ONE HALF FRAME UPDATING

BACKGROUND OF THE INVENTION

1. Field Of The Invention

The present invention concerns raster type cathode ray tube displays particularly with respect to full field memory refresh apparatus to provide the symbology to be displayed.

2. Description Of The Prior Art

Prior art raster type CRT displays traditionally utilize two full field refresh memories in which one of the memories is updated with symbology utilizing a vector generator while the other memory is scanned for display. The roles of the two memories are reversed on alternate display cycles in "ping-pong" fashion. This prior art arrangement has the disadvantage of requiring excessive apparatus and power particularly when multiple channels of raster symbology are required and is often referred to as a double buffered system. In the double buffered configuration the excessive circuitry, space and power requirements result in excessive equipment cost. In such double buffered systems there is a one to one correspondence between the storage cells of each full field memory and the pixel resolution elements of the display screen. In the multiple channel configuration two full field memories are required for each channel exacerbating the circuitry, space, power and cost disadvantages.

An alternative prior art configuration is the utilization of a single full field memory updated by the vector generator during the vertical retrace period. This arrangement has the disadvantage that in typical calligraphic combination raster and stroke systems the vector generator is utilized to write stroke symbology on the display during the vertical retrace period and is thus unavailable for refresh memeory updating.

Prior art raster display systems often operate in a plurality of line rate TV modes, for example, 525 and 875 line rates. Plural line rate modes further complicate the addressing of the full field memory in such systems.

SUMMARY OF THE INVENTION

The disadvantages of the prior art are overcome by utilizing the two halves of a single full field memory. While one half of the memory is being scanned for display the other half is updated by the vector generator. The most and least significant Y addressing bits are multiplexed to effect even/odd ping ponging for a 525 line rate TV mode and top/bottom ping ponging for an 875 line rate TV mode.

BRIEF DESCRIPTION OF THE DRAWINGS

The sole figure, is a schematic block diagram of a single full field memory arrangement that is updatable during the vertical scan of the raster display in accordance with the present invention.

DESCRIPTION OF THE PREFERRED EMBODIMENT

Referring to the sole figure, display refresh memory apparatus implemented in accordance with the present invention is illustrated. Ihe apparatus of the figure is utilized in a conventional digitally generated raster display and stroke generation system wherein digital X and Y control signals are utilized to position the beam across the display face thereby generating a TV raster. The digital X and Y signals are also utilized to address the refresh memories. In the prior art two full field memories are utilized which are alternately read and updated in ping pong fashion to provide the display. The digital X and Y signals address the locations of the memory in synchronism with the positioning of the beam whereby the memory location currently addressed provides the video for the pixel at which the beam is positioned. Typically the stroke or vector generator of the system writes the updating data into one of the memories while the other memory is being scanned for readout. The stroke or vector generator is often referred to as the graphics generator of the system. The graphics generator provides digital X and Y addressing signals for the entry of the data. This graphic generator is time-shared between the stroke writing and the addressing of the full field memory. The digital raster generator also provides digital X and Y signals for addressing the memory being scanned for readout. In the present embodiment full field refresh may be supported by a $512 \times 512 \times N$ random access memory (RAM) configuration providing a potential field of $512 \times 512$ pixels. N is the number of bits of digital video output.

The apparatus of the figure includes a pair of ½ field refresh memories 10 and 11. Each of the memories 10 and 11 comprise, for example, $512 \times 256 \times N$ RAM's which replace the traditional pair of full field refresh memories which, for example, would comprise a pair of $512 \times 512 \times N$ memory arrays. Input data to be written into each of the memories 10 and 11 are provided on buses 12 and 13 respectively.

In the embodiment of the invention illustrated in the figure, 525 and 875 line rate modes are supported. In the 525 mode, ping ponging is effected between the half fields comprising the even lines and the odd lines respectively. In the 875 mode ping ponging is affected between the half frames comprising the top half of the frame and the bottom half of the frame. In the 525 mode the memory 10 is utilized to service the even lines and the memory 11 is utilize to service the odd lines. In the 875 mode the memory 10 is uitilized to service the top half frame and the memory 11 is utilized to service the bottom half frame.

The X address words utilized in the system are comprised of nine bits, X0–X8 and control the horizontal direction and the Y address words comprise nine bits, Y0–Y8, and control the presentation of information in the vertical aspect. This addressing arrangement provides the horizontal and vertical resolution of 512 pixels which in the vertical aspect is divided into 256 lines in each of the memories 10 and 11 in a manner to be described. With respect to the Y addresses, Y0 alternates between binary 1 and binary 0 with every horizontal line of video, Y1 alternates at half the rate of Y0, Y2 at half that rate, etc., and the Y8 bit alternates between binary 1 and binary 0 once per image field. The Y0 and the Y8 bits are utilized to access the odd and even numbered sets of image addresses in the 525 mode and the top half and bottom half sets of image addresses in the 875 mode in a manner to be clarified.

Addresses for writing data provided by the graphics generator into the memories 10 and 11 are provided on a bus 14 applied as the WRITE input of a multiplexer 15 and as the WRITE input of a multiplexer 16. The most significant bit Y8 and the least significant bit Y0 are applied respectively to the 525 mode and 875 mode inputs of a multiplexer 17. The multiplexer 1 is controlled by a mode signal on a line 18 to connect the Y8 bit to the output of the multiplexer 17 when the system is operating in the 525 TV mode and to connect the Y0 bit to output of the multiplexer 17 when the system is operating in the 875 TV mode. The selected bit Y0 or Y8 is applied to the bus 14 where it is concatenated with the remaining vertical address bits Y1-Y7 to form a vertical address Y1-Y8 in the 525 mode or a vertical address Y0-Y7 in the 875 mode. During 525, the 48 address bit is routed the memory on the least significant physical address line (YO) in order to reduce the hardware required. The horizontal address bits X0-X8 are concatenated with the vertical address bits to form a 17 bit address on the bus 14. Ihe horizontal address bits X0-X8 and vertical address bits Y1-Y7 are applied to the bus 14 via a bus 19.

In a similar manner readout addresses are formed on a 17 bit bus 20 for reading out the memories 10 and 11 so as to provide the display scan. The readout addresses on the bus 20 are applied to the READ inputs of the multiplexers 15 and 16. The most significant bit Y8 and the least significant bit Y0 of the vertical addresses are applied to the 525 mode and 875 mode inputs of a multiplexor 21. The multiplexer 21 is controlled by the mode signal on the line 18 to provide the Y8 readout address bit to the output of the multiplexer 21 when the system is operating in the 525 TV mode (again and the least significant address line (YO) to achieve symmetry with the input mode) and to apply the Y0 readout address bit to the output of the multiplexer 21 when the system is operating in the 875 TV mode. The output of the multiplexer 21 is concatenated with the remaining vertical address bits Y1-Y7 and the horizontal address bits X0-X8 provided on a bus 22 to form the readout addresses on the bus 20.

The output of the multiplexer 15 provides a 17 bit address to the address port 23 of the memory 10 and the output of the multiplexer 16 provides a 17 bit address to the address port 24 of the memory 11. The multiplexers 15 and 16 are controlled whereby when the WRITE input of one of the multiplexers is connected to its output, the READ input of the other multiplexer is connected to its output so that when one of the memories 10 and 11 is being scanned for readout the other memory is being updated by the graphics generator as described above. When the system is operating in the 525 TV mode, the fields consisting of the even numbered raster lines are stored in and read out from the memory 10 and the fields consisting of the odd numbered raster lines are stored in and read out from the memory 11. When the system is operating in the 875 TV mode, the memory 10 is utilized to store and readout the top half of each frame and the memory 11 is utilized to store and readout the bottom half of each frame. In the present system Y0 is binary 0 for even numbered lines and binary 1 for odd numbered lines and Y8 is binary 0 for the top half of each frame and Y8 is binary 1 for the bottom half of each frame.

A Write Enable signal on a line 25 is applied via an address qualifier 26 to alternately enable the memories 10 and 11 for writing in the graphics generator data on the buses 12 and 13 respectively. When the Write Enable signal enables one of the memories 10 and 11 for writing the other memory is enabled for reading.

The least significant vertical address bit Y0 for addressing the writing of the graphics generator data is applied to the 525 mode input of a multiplexer 27 and the most significant graphics generator bit Y8 is applied to the 875 mode input thereof. The multiplexer 27 is controlled by the mode signal on the line 18 to connect the graphics generator Y0 addressing bit to the output line 28 of the multiplexer 27 when the system is in the 525 TV mode and to connect the graphics generator Y8 addressing bit to the line 28 when the system is operating in the 875 TV mode. In a similar manner a multiplexer 29 connects the readout address least significant bit Y0 to a line 30 when the system is in the 525 TV mode and the readout address most significant bit Y8 to the line 30 when the system is operating in the 875 TV mode. It is appreciated that in the 525 TV mode the multiplexers 17 and 21 utilize the Y8 addressing bit for both reading and writing whereas multiplexers 27 and 29 utilize the Y0 addressing bit. Conversely in the 875 mode the multiplexers 17 and 21 utilize the Y0 bit and the multiplexers 27 and 29 utilize the Y8 bit.

Ihe address qualifier 26 is responsive to the outputs on the lines 28 and 30 and to the Write Enable signal on the line 25 for enabling the memories 10 and 11 for reading and writing and for controlling the multiplexers 15 and 16 so as to direct the appropriate addresses to the memories. The address qualifier 26 also controls a multiplexer 31 responsive to the outputs of the memories 10 and 11 for providing the output of the memory being read as the digital video on a line 32. If the word length N of the memories 10 and 11 is one bit than the digital video provided on the line 32 will control the application of one color. If N is 2 or more, plural colors may be controlled by the digital video signal.

The address qualifier 26 is comprised of 2 three input AND gates 33 and 34. The Write Enable signal on the line 25 is applied to one of the inputs of each of the gates 33 and 34. The output of the multiplexer 27 on the line 28 is applied to a second input of the gate 33 and is applied inverted to a second input of the gate 34. The output of the multiplexer 29 on the line 30 is applied to the third input of the gate 34 and inverted to the third input of the gate 33. The output of the multiplexer 29 on the line 30 is also utilized as a select signal to control the multiplexers 15,16, and 31. The output of the AND gate 33 provides the Write Enable signal for the memory 11 and the output of the AND gate 34 provides the Write Enable signal for the memory 10.

In operation in the 525 line TV mode the memory 10 is utilized to store and read the even numbered raster lines while the memory 11 is utilized to store and read the odd numbered raster lines. As described above the address bit Y0 is binary 0 for even numbered lines and binary 1 for odd numbered lines. When the even line frame is being updated by the graphics generator and the odd line frame is being read out to the display, the graphics generator Y0 bit will be binary 0 while the readout address Y0 bit will be binary 1. Under these conditions the Write Enable signal WE-10 will be high thereby enabling the memory 10 for writing and the Write Enable signal WE-11 will be low thereby enabling the memory 11 for reading. The binary 1 output of the multiplexer 29 on the line 30 controls the multiplexer 16 to direct the readout addresses from the multiplexer 21 into the address port of the memory 11 and controls the multiplexer 15 to direct the graphics generator addresses into the address port 23 of the memory 10 for updating the memory. The binary 1 select signal on the line 30 also controls the multiplexer 31 to direct the output of the memory 11 onto the line 32 to provide the digital video to the display. When the last even line in the even line frame has been updated and the last line of the of the odd line frame has been read out, the graphics generator Y0 bit changes from binary 0 to binary 1 and the readout Y0 bit changes from binary 1 to binary 0 thereby causing the roles of the memories 10 and 11 to swap or ping pong so that the even lines from the memory 10 are read out into the display and the odd lines in the memory 11 are updated by the graphics generator.

In the 875 mode the multiplexers 27 and 29 utilize the Y8 bit to generate the WE-10 and the WE-11 signals and to control the multiplexers 15,16, and 31 resulting in the memory 10 being utilized for the raster lines in the top half of the display frame and for the memory 11 to be utilized for the raster lines in the bottom half of the display frame. Since the Y8 bit switches between binary 0 and binary 1 at mid frame the memories 10 and 11 are controlled to ping pong between reading out to the display and being updated by the graphics generator.

It is appreciated from the foregoing that in the 875 mode the natural progression of the 9 binary counting bits Y0-Y8 results in the operation described above. In this mode Y0 is the least significant bit and alternates for successive raster lines and Y8 is the most significant bit and remains in the binary 0 state for the top half of the display frame and switches to the binary 1 state for the bottom half thereof. In the 525 mode the roles of Y0 and Y8 are interchanged in the apparatus of the figure whereby Y0 becomes the most significant bit and Y8 becomes the least significant bit. This reversal in the roles of Y0 and Y8 are effected by the switching multiplexers 17, 21, 27, and 29. Thus in the 525 mode the Y0 bit separates the frame into a field consisting of the even lines and a field consisting of the odd lines. In the 525 mode the Y0 bit, via the multiplexers 27 and 29, separates the addressing into the memories 10 and 11 and the remaining vertical bits Y1-Y8 via the multiplexers 17 and 21 address the locations in the individual memories. In the 875 mode the Y8 bit via the multiplexers 27 and 29 separates the addressing between the two memories 10 and 11 and the remaining bits Y0-Y7 via the multiplexers 17 and 21, address the individual memories.

The above described memory switching operations are synchronized by means, not shown, with horizontal retrace non - access times to avoid disturbances to the image caused by invalid memory access cycles. In the system in which the present invention is utilized each frame of data is presented twice with the Y0 and Y8 bits, via the multiplexers 27 and 29, qualifying the writing operations of the memories 10 and 11 so that the appropriate fields comprising the frames are written into the memories. For example, in the 525 mode only the even lines are written when the frame of information is presented for the first time and only the odd lines are written when the frame is presented for the second time. Thus a full image is inserted into the half-image space represented by each of the memories 10 and 11 by discarding one-half of the information each cycle. The address qualifier 26 performs this function.

The utilization of the most and least significant vertical address bits utilized to steer and write-qualify the memories 10 and 11 effects a significant savings by the elimination of numerous expensive memory devices. The pair of memories 10 and 11 may be switched more rapidly than is conventional with full field ping ponging arrangements to achieve a continuous update-read operation. The enhancement in switching speed resulting in a savings in memory is effected since less data than in a conventional system is required to be stored prior to the next switching operation. The discarding of portions of the pattern generation address set is compensated by rewriting the missing portions of the image following a switching operation as described above. For each channel of the system the conventional pair of full field memory arrays ($512 \times 512$) is replaced with a pair of half field memory arrays ($512 \times 256$) resulting in substantial savings. The two memory arrays 10 and 11 provide a full field memory for storing an image suitable for display upon the CRT screen of the system. The operation of the invention comprises the sequencial and repetitive readout of the memory contents as described above in a format compatible with the conventional video standards of the system in which the apparatus of the figure is utilized.

In effect a single plane of full field memory, for example $512 \times 512$ bits, is divided in half. While one memory area is being read for display the other half is being updated by the graphics generator. The addressing multiplexers permit even/odd ping ponging for the 525 mode and top/bottom ping ponging for the 875 mode. The graphics generator writes to the full addressing space of the full field memory. Only the active half thereof, however, actually records the data. The complete set of symbology is written twice to provide a complete image. The present invention provides full field memory refresh but without the conventional double ping pong buffering. In the present invention the single full field memory ping pongs on one-half fields. The vector generator writes to half of the full field memory while the other half is being read. Unlike in the prior art, however, only a single full field memory plane is utilized. The vector generator writes to the full field memory during the vertical scan and is available to perform stroke symbology writing during the vertical retrace. The present invention utilizes only one-half of the memory chips required of a full double buffered, full field memory system. Power, space and cost are appreciably reduced. The writing of the memory during the vertical scan period permits the vector generator to be utilized during vertical retrace for stroke symbology.

While the invention has been described in its preferred embodiment it is to be understood that the words which have been used are words of description rather than limitation and that changes may be made within the purview of the appended claims without departing from the true scope and spirit of the invention in its broader aspects.

We claim:

1. Refresh memory apparatus for use in a display system having means for generating a raster and means for providing digital signals synchronous with respect to said raster, said apparatus comprising:
   first memory means for storing a first portion of a frame of image signals,
   second memory means for storing a second portion of a frame of image signals,
   said first and second portions comprising an entire frame of image signals, and
   switching means responsive to said digital signals for alternately: (A) controlling said first memory means for writing updated image signals into said first memory means with respect to said first portion while controlling said second memory means for reading out said second portion stored therein to said display system and (B) controlling said second memory means for writing updated image signals into said second memory means with respect to said second portion while controlling said first memory means for reading out said second portion stored there in to said display system.

2. The apparatus of claim 1 in which said display system includes
vector generator means for generating stroke symbology for said display system, and
timer means for providing digital readout address signals synchronous with respect to said raster and digital vector generator address signals synchronous with respect to said raster,
said readout address signals and said vector generator address signals comprising said digital signals.

3. The apparatus of claim 2 in which
said display system operates in first and second TV modes,
said first and second portions comprise the odd and even lines of said raster, respectively, when said display system is operating in said first TV mode, and
said first and second portions comprise the lines of the top half and bottom half of said raster, respectively, when said display is operating in said second TV mode.

4. The apparatus of claim 3 in which said readout address signals and said vector generator address signals each comprise first and second address words, said first address word relating to raster line addresses and said second address word relating to resolution elements comprising the raster lines.

5. The apparatus of claim 4 in which said switching means comprises
first multiplexer means responsive to the most significant bit and the least significant bit of said first address words for selecting said most significant bit or said least significant bit in accordance with the TV mode in which said display system is operating, and
means coupled to said first multiplexer means for providing signals for controlling the writing and reading of said first and second memory means in accordance with the binary state of the bit selected by said first multiplexer means.

6. The apparatus of claim 5 in which said switching means further includes second multiplexer means responsive to said most significant and least significant bits of said address words for selecting the bit not selected by said first multiplexer means in accordance with said TV mode in which said display system is operating.

7. The apparatus of claim 6 in which said switching means further comprises means for combining the bit selected by said second multiplexer means with said first and second address words to provide said readout address signals and said vector generator address signals.

8. The apparatus of claim 7 in which said switching means further comprises third multiplexer means responsive to said readout address signals and said vector generator address signals for selectively applying said readout address signals and said vector generator address signals to said first and second memory means in accordance with the bit selected by said first multiplexer means.

* * * * *